US012723722B2

(12) United States Patent
Jaburek et al.

(10) Patent No.: US 12,723,722 B2
(45) Date of Patent: Sep. 1, 2026

(54) VERTICAL HEADLAMP UNIT OF AN AUTOMOTIVE VEHICLE

(71) Applicant: PO Lighting Czech, s.r.o., Senov u Noveho Jicina (CZ)

(72) Inventors: Petr Jaburek, Senov u Noveho Jicina (CZ); Ivo Pavlik, Senov u Noveho Jicina (CZ); Daniel Rapala, Senov u Noveho Jicina (CZ); Jakub Cernoch, Senov u Noveho Jicina (CZ)

(73) Assignee: PO Lighting Czech, s.r.o., Senov u Noveho Jicina (CZ)

( * ) Notice: Subject to any disclaimer, the term of this patent is extended or adjusted under 35 U.S.C. 154(b) by 0 days.

(21) Appl. No.: 19/054,798

(22) Filed: Feb. 15, 2025

(65) Prior Publication Data

US 2025/0264198 A1 Aug. 21, 2025

(30) Foreign Application Priority Data

Feb. 20, 2024 (EP) .................................... 24158508

(51) Int. Cl.

| | |
|---|---|
| ***F21S 41/26*** | (2018.01) |
| ***F21S 41/141*** | (2018.01) |
| ***F21S 41/20*** | (2018.01) |
| *F21W 102/13* | (2018.01) |
| *F21Y 115/10* | (2016.01) |

(52) U.S. Cl.
CPC ............. *F21S 41/26* (2018.01); *F21S 41/141* (2018.01); *F21S 41/285* (2018.01); *F21W 2102/13* (2018.01); *F21Y 2115/10* (2016.08)

(58) Field of Classification Search
CPC ........ F21S 41/26; F21S 41/141; F21S 41/285; F21W 2102/13
See application file for complete search history.

(56) References Cited

U.S. PATENT DOCUMENTS

| | | | | |
|---|---|---|---|---|
| 2016/0033101 | A1* | 2/2016 | Yan | F21S 41/24 362/520 |
| 2018/0370421 | A1 | 12/2018 | Nakano | |
| 2023/0417384 | A1* | 12/2023 | Woo | F21S 41/143 |
| 2024/0183508 | A1* | 6/2024 | Bae | F21S 41/148 |
| 2024/0328589 | A1 | 10/2024 | Albou | |
| 2024/0418332 | A1* | 12/2024 | Wu | F21S 41/285 |
| 2025/0164092 | A1* | 5/2025 | Jung | F21S 41/265 |
| 2025/0334241 | A1* | 10/2025 | Jung | F21S 41/151 |

FOREIGN PATENT DOCUMENTS

| | | | |
|---|---|---|---|
| DE | 202023104801 | U1 | 11/2023 |
| EP | 3222906 | A1 | 9/2017 |
| FR | 3124844 | A1 | 1/2023 |
| WO | 2024033122 | A1 | 2/2024 |

OTHER PUBLICATIONS

European Patent Office, European Search Report, Jun. 3, 2024.

* cited by examiner

*Primary Examiner* — Christopher E Dunay

(57) ABSTRACT

The invention relates to an automotive vehicle headlamp module (2, 16) designated to illuminate a road, the headlamp module (2, 16) comprising lighting units (4'), each lighting unit (4') comprising at least one lens (10, 26) configured to generate light, each lighting unit (4') comprising a light exit area, the lens (10, 26) being disposed in the lighting unit (4') in such a way that a height of the lens (10, 26) is greater than a width of the lens (10, 26).

8 Claims, 2 Drawing Sheets

VERTICAL HEADLAMP UNIT OF AN AUTOMOTIVE VEHICLE

The invention relates to the headlamp modules of automotive vehicles.

It is known to mount rectangular headlamp modules on the front face of an automotive vehicle. By “horizontal,” we mean a headlamp module comprising a housing for receiving light elements that is wider than it is tall, for example, 3 times wider than tall.

Some automobile manufacturers, for aesthetic reasons, wish to mount vertical headlamp modules on the front face of an automotive vehicle in order to achieve a distinctly different visual appearance of the vehicle. By “vertical,” we mean a headlamp module comprising a housing for receiving light elements that is taller than it is wide, for example, 3 times taller than wide.

However, the installation of vertical headlamp modules can lead to a decrease in the lighting performance of the headlamp module. For example, for a low beam, the uniformity of the lighting may no longer be optimal. In another example, for a high beam, the luminous intensity may not be optimal to achieve sufficiently effective lighting.

The invention aims in particular to provide a vertical headlamp module for an automotive vehicle that, while achieving the desired aesthetic effect, provides lighting performance equivalent to that of conventional headlamp units in terms of uniformity and/or lighting intensity.

To this end, the invention relates to an automotive vehicle headlamp module designed to illuminate a road, the headlamp module comprising lighting units, each lighting unit comprising at least one lens configured to generate light, each lighting unit comprising at least one light exit area, the lens being disposed in the lighting unit in such a way that a height of the lens is greater than a width of the lens.

Thus, the disposition of the lens is in such a way as to allow to obtain a vertical aspect of the light coming from the lighting units and to provide lighting performance equivalent to that of conventional headlamp units in terms of uniformity and/or lighting intensity. When several lighting units are used, it is possible to adapt a specific lighting function of one of them without impacting the function of others. It is also possible to achieve a different arrangement of light elements between two lighting units, either to obtain two different lighting effects between each chamber or to achieve a cumulative lighting effect by activating the light elements of both lighting units.

These different adaptations of the lighting units of the headlamp module allow for retaining the functions of conventional optical units (each lighting unit can have a different arrangement of light elements) while locally adapting the headlamp module to maintain satisfactory lighting performance in at least one chamber of the housing.

According to other optional features of the headlamp module, taken alone or in combination:

- each lighting unit is configured to generate a light pattern on different parts of the road, the lighting units being stacked above one another in a vertical direction when the headlamp module is mounted on a vehicle;
- each lighting unit is configured to generate a light pattern on a same part of the road, the lighting units being stacked above one another in a vertical direction when the headlamp module is mounted on a vehicle;
- the headlamp module is configured to be inclined relative to a vertical axis of an automotive vehicle when the headlamp module is mounted on an automotive vehicle, the angle of inclination between a vertical axis of an automotive vehicle and a longitudinal axis of the lens being less than or equal to 45°;
- conservation of lighting performance in the event of inclination of the headlamp module is achieved by movement of the focal point of the lens in a transverse direction of an automotive vehicle when the headlamp module is mounted on an automotive vehicle;
- the height of the lens is between two and four times greater than its width; and
- the height of the lens is substantially equal to 75 mm (3.0 in) and its width is substantially equal to 25 mm (1.0 in).

The invention also relates to an automotive vehicle comprising at least one headlamp module according to the invention.

BRIEF DESCRIPTION OF THE FIGURES

The invention will be better understood on reading the following description, which is given by way of example only and with reference to the appended drawings in which.

DETAILED DESCRIPTION

Figure 1:
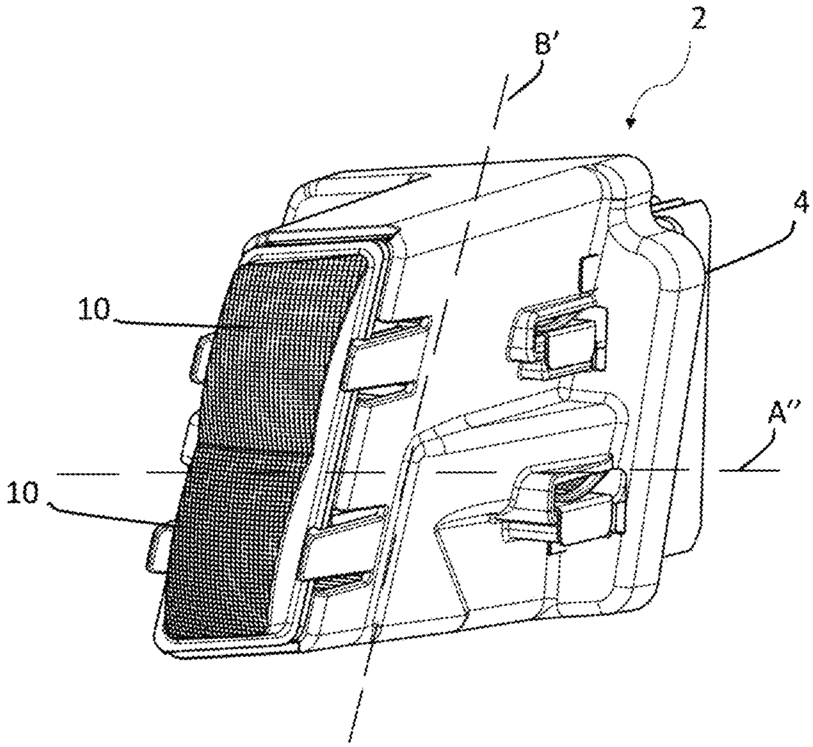
FIG. 1 is a perspective view of part of a headlamp module in a first arrangement.
Figure 2:
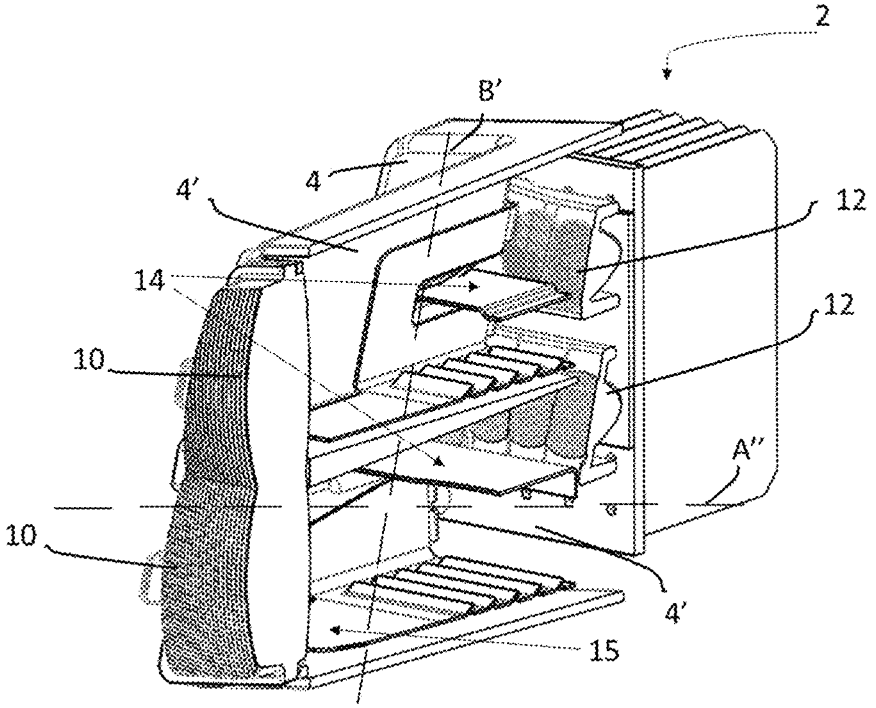
FIG. 2 is a perspective view comprising a cross-section of the headlamp module of FIG. 1.
Figure 4:
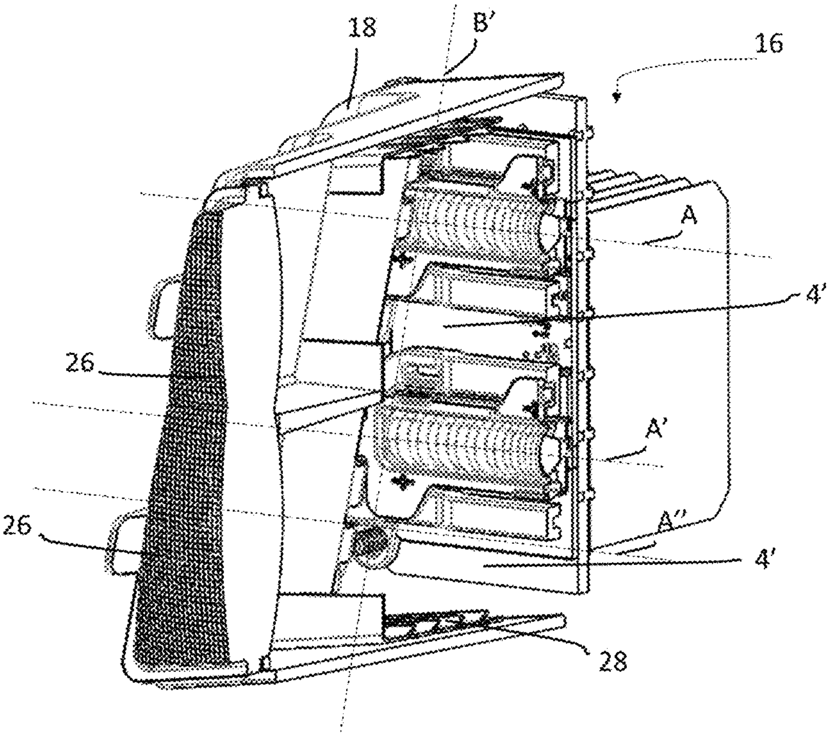
FIG. 4 is a perspective view comprising a cross-section of the headlamp module of FIG. 3.

We now refer to FIG. 1 illustrating an automotive headlamp module, or a part of a headlamp module, designated to illuminate a road, comprising at least one housing 4 for receiving lighting units 4' (in this example two lighting units for one housing, see FIGS. 2 and 4). Each lighting unit 4' comprises at least one light exit area and at least one lens (10, 26), the lens (10, 26) being disposed in the lighting unit such a way that a height of the lens (10, 26), i.e., of its active surface, is greater than a width of the lens (10, 26), i.e., of its active surface.

In a preferred embodiment, the height of the lens (10, 26) is substantially equal to 75 mm (3.0 in) and its width is substantially equal to 25 mm (1.0 in). More generally, the height of the lens (10, 26) is between two and four times greater than its width.

The housing 4 can also have a height greater than its width (same or different ratio height/width than the lighting unit 4'), or another form.

In the example of the figures, the headlamp module 2 (or 16 on FIGS. 3 and 4) comprises several lighting units 4', each lighting unit 4' can be configured to generate a light pattern on different parts of the road, the lighting units 4' being stacked above one another in a vertical direction when the headlamp module 2 or 16 is mounted on a vehicle. Alternatively, each lighting unit 4' can be configured to generate a light pattern on a same part of the road, the lighting units being stacked above one another in a vertical direction when the headlamp module is mounted on a vehicle.

Preferably, the lighting units are made in such a way that the light emitted by a lighting unit cannot pass to another lighting unit.

In the example visible in FIG. 2, the two lighting units 4' form two chambers (a first lower chamber and a second upper chamber) in the housing 4, positioned one above the other, with each chamber receiving different light elements in terms of nature and/or type, each chamber performing a different lighting function of the headlamp module. In the following parts of the description, the term "chambers" will be used to describe the lighting units.

In the example of FIGS. 1 and 2, the headlamp module 2 is a low beam comprising a first housing 4 comprising a first lower chamber arranged for generating a base beam of the low beam and a second upper chamber arranged for generating a kink beam. In this case, the number of light sources is greater in the first lower chamber than in the second upper chamber, preferably two to four times greater. In the illustrated example, the first lower chamber comprises seven single-chip LEDs, while the second upper chamber comprises three single-chip LEDs.

The spread of microstructures inside the first lower chamber is greater than the dispersion of microstructures inside the second upper chamber. The microstructures are used for two reasons: first to reduce cut-off line sharpness at low beam; and the second reason for a high beam or a base beam to tune the homogeneity of beam. This allows a better lighting uniformity in the first lower chamber forming the base beam of the low beam. Such spread is not possible for generating a kink beam. The separation into two chambers allows an adaptation of the first lower chamber to achieve uniform lighting while arranging the second upper chamber differently to generate the kink beam.

The headlamp module 2 also includes a collimator 12 for both chambers and a shield 14 for each chamber, as well as a sunload shield 15 on the underside of the first lower chamber.

Figure 3:
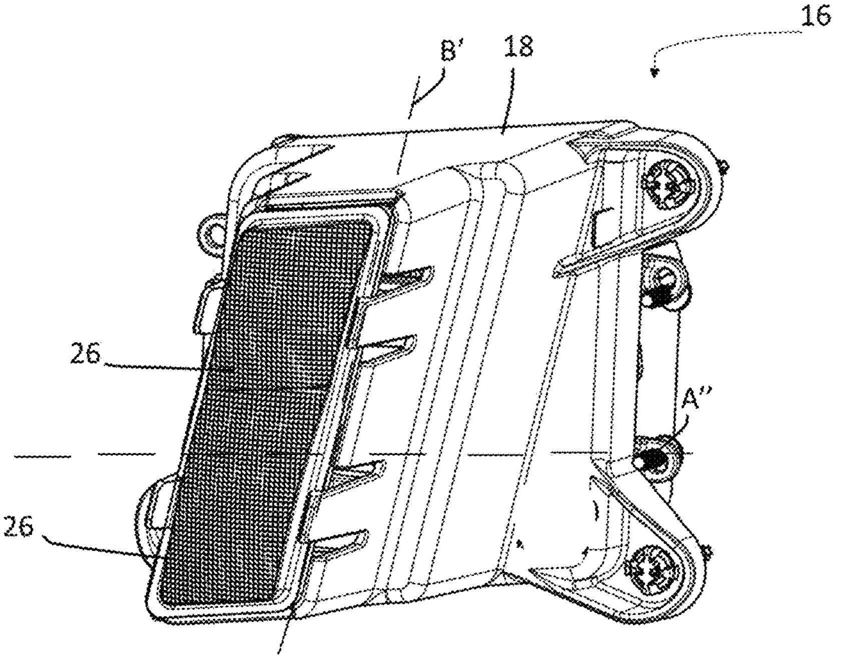
FIG. 3 is a perspective view of part of a headlamp module according to a second arrangement.

Regarding FIGS. 3 and 4, the headlamp module 16 forms a high beam comprising a second housing 18 (also preferably with a height of 75 millimeters (3.0 inches) and a width of 25 millimeters (1.0 inches)) comprising a third lower chamber arranged for generating a lower beam and a fourth upper chamber arranged for generating an upper beam. In this case, the number of light sources can be greater in one of the two chambers than in the other or can be the same. In the illustrated example, the third lower chamber comprises eleven single-chip LEDs, while the fourth upper chamber comprises seven single-chip LEDs. It would also be possible to have an identical number of seventeen single-chip LEDs per chamber.

Advantageously, the light sources in the third lower chamber and the fourth upper chamber are identical and arranged on two supports parallel to each other and extending in directions A and A' parallel to a transverse axis A" of the second housing 18, with a part of the light sources overlapping in a direction B parallel to a longitudinal axis B' of the second housing. This partial overlap allows to obtain an optimal light intensity in the central area of the headlamp module 16 while maintaining the peripheral areas with less intense lighting.

The headlamp module 16 also includes a sunload shield 28 on the underside of the third lower chamber and identical light source supports between the third lower chamber and the fourth upper chamber. This identity allows to obtain a cost-effective lighting solution. The supports comprise multiple areas for receiving light sources, occupied in whole or in part by light sources, while ensuring partial overlap between the light sources of the two supports.

The lighting functions of the different lighting units 4' forming the headlamp module 2 can be different or the same. A combination of these functions to obtain a final lighting is possible or not.

Advantageously, the headlamp module can be configured to be inclined relative to a vertical axis of an automotive vehicle when the headlamp module 2 or 16 is mounted on an automotive vehicle, the angle of inclination between a vertical axis of an automotive vehicle and a longitudinal axis of the lens (10, 26) being less than or equal to 45°. This allows for achieving an even more personalized aesthetic effect on the front face of the automotive vehicle.

Preservation of lighting performance in the event of inclination of the headlamp module 2 or 16 is achieved by moving the focal point of the lens (10, 26) in a transverse direction of an automotive vehicle when the optical unit 2 or 16 is mounted on an automotive vehicle. It is possible to incline the headlamp module 2 or 16 while moving the focal point of the second and fourth upper chambers to follow this inclination and achieve optimal lighting without having to incline the shape of the lenses 10 or 26.

The invention also relates to an automotive vehicle comprising at least one headlamp module according to the invention, typically a vehicle comprising two headlamp modules on the front, on the left and right sides of the vehicle. The optical units 2 and 16, fulfilling, in the described example, the functions of low and high beams, can be superimposed or offset from each other.

LIST OF REFERENCES

2, 16: headlamp module
4, 18: housing
4': lighting units
10, 26: lens
12: collimators
14: shields
15, 28: sunload shields
A, A': brackets extension direction
A": housing transverse direction
B': housing longitudinal direction

The invention claimed is:

1. Automotive vehicle headlamp module (2, 16) designated to illuminate a road, the headlamp module (2, 16) comprising lighting units (4'), each lighting unit (4') comprising at least one lens (10, 26) configured to generate light, each lighting unit (4') comprising a light exit area, the lens (10, 26) being disposed in the lighting unit (4') in such a way that a height of the lens (10, 26) is greater than a width of the lens (10, 26), wherein a first lighting unit and a second lighting unit are configured to receive different lighting elements in terms of type and/or number to perform different lighting functions, and wherein the first lighting unit forms a first chamber of a housing of the headlamp module (2, 16) and the second lighting unit forms a second chamber of the housing so that the light emitted by one of the first lighting unit or the second lighting unit cannot pass to the other of the first lighting unit and second lighting unit.

2. Headlamp module (2, 16) according to claim 1, wherein conservation of lighting performance in the event of inclining of the headlamp module (2, 16) is achieved by movement of the focal point of the lens (10, 26) in a transverse direction of an automotive vehicle when the headlamp module (2, 16) is mounted on an automotive vehicle.

3. Headlamp module (2, 16) according to claim 1, wherein the height of the lens (10, 26) is between two and four times greater than its width.

4. Headlamp module (2, 16) according to claim 3, wherein the height of the lens (10, 26) is substantially equal to 75 mm (3.0 in) and its width is substantially equal to 25 mm (1.0 in).

5. Automotive vehicle comprising at least one headlamp module (2, 16) according to claim 1.

6. Headlamp module (2, 16) according to claim 1, wherein the first lighting unit is configured to generate a base beam and the second lighting unit is configured to generate a kink beam.

7. Headlamp module (2, 16) according to claim 6, wherein the first lighting unit has a higher number of lighting elements than the second lighting unit.

8. Headlamp module (2, 16) according to claim 7, wherein the lighting elements are single-chip LEDs and are identical.

* * * * *